United States Patent [19]

Andress et al.

[11] Patent Number: 5,842,279

[45] Date of Patent: Dec. 1, 1998

[54] GUIDE BAR FOR A MOTOR CHAIN SAW

[75] Inventors: Bernd Andress, Erdmannhausen; Roland Schierling, Affalterbach, both of Germany

[73] Assignee: Andreas Stihl AG & Co., Wailblingen, Germany

[21] Appl. No.: 975,797

[22] Filed: Nov. 21, 1997

[30] Foreign Application Priority Data

Nov. 22, 1996 [DE] Germany .......................... 196 48 437.5

[51] Int. Cl.⁶ ................................................. B27B 17/02
[52] U.S. Cl. ................................................. 30/387; 30/383
[58] Field of Search .......................... 30/387, 383, 381; 83/821; 76/112

[56] References Cited

U.S. PATENT DOCUMENTS

| | | | |
|---|---|---|---|
| 4,903,410 | 2/1990 | Weininger et al. | 30/387 |
| 5,025,561 | 6/1991 | Sugihara et al. | 30/387 |
| 5,035,058 | 7/1991 | Date et al. | 30/387 |
| 5,067,243 | 11/1991 | O'Neal | 30/387 |
| 5,249,363 | 10/1993 | Mitrega et al. | 30/387 |
| 5,271,157 | 12/1993 | Wieninger et al. | 30/387 |

FOREIGN PATENT DOCUMENTS 3346321  7/1985  Germany .

*Primary Examiner*—Douglas D. Watts
*Attorney, Agent, or Firm*—Robert W. Becker & Associates

[57] ABSTRACT

A guide bar for a saw chain of a motor chain saw has a single member steel plate having a center plane and a circumferential guide groove for guiding a saw chain extending in the center plane. The steel plate has a longitudinal extension and a height perpendicular to the longitudinal extension. The steel plate has a cutout extending over a portion of the longitudinal extension and over a portion of the height. A filling member, consisting of a casting material having a smaller density than the steel plate, is cast into the cutout. The cutout has a circumferential edge facing the filling member. The circumferential edge has undercuts uniformly distributed along the circumferential edge. The filling member has a shrinkage rate of at least 0.5% for engaging positive-lockingly the undercuts upon solidification of the casting material to thereby create a uniformly distributed pretension within the center plane of the guide bar in the unloaded state of the guide bar.

17 Claims, 9 Drawing Sheets

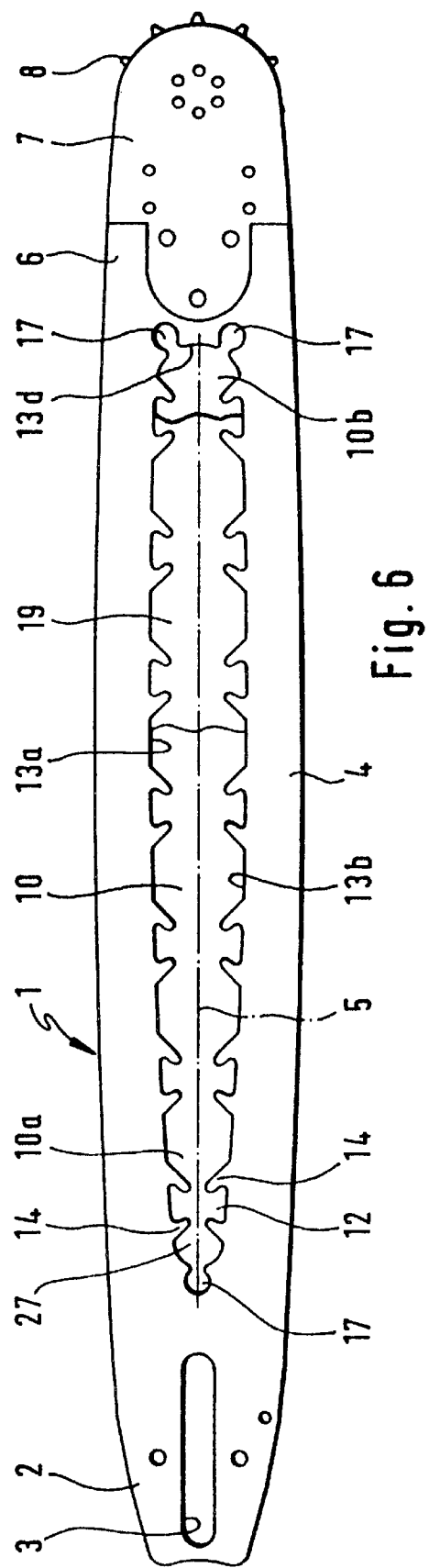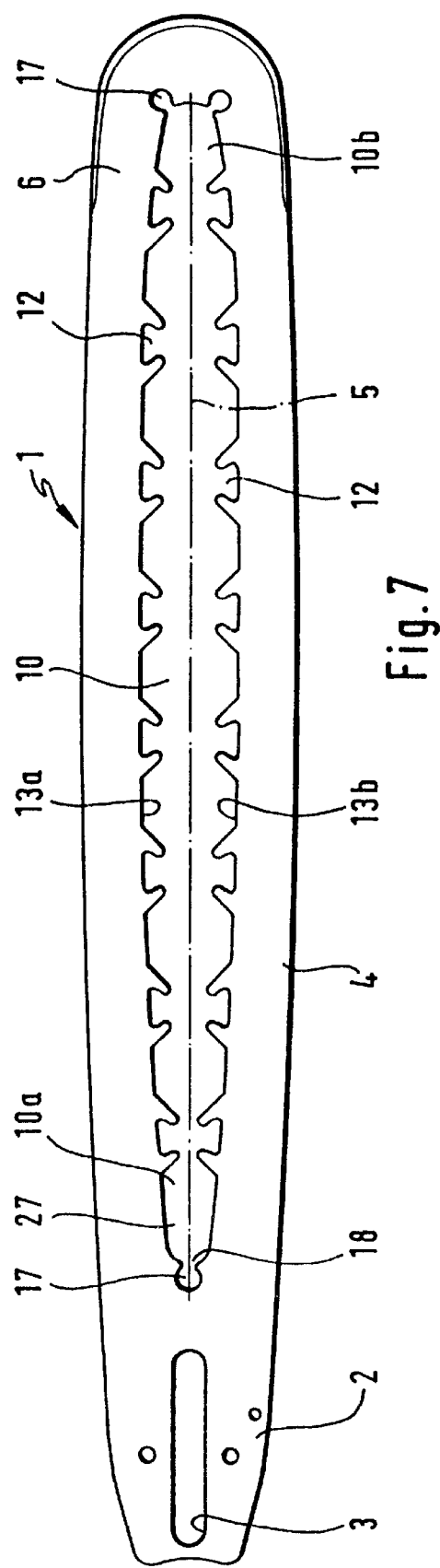

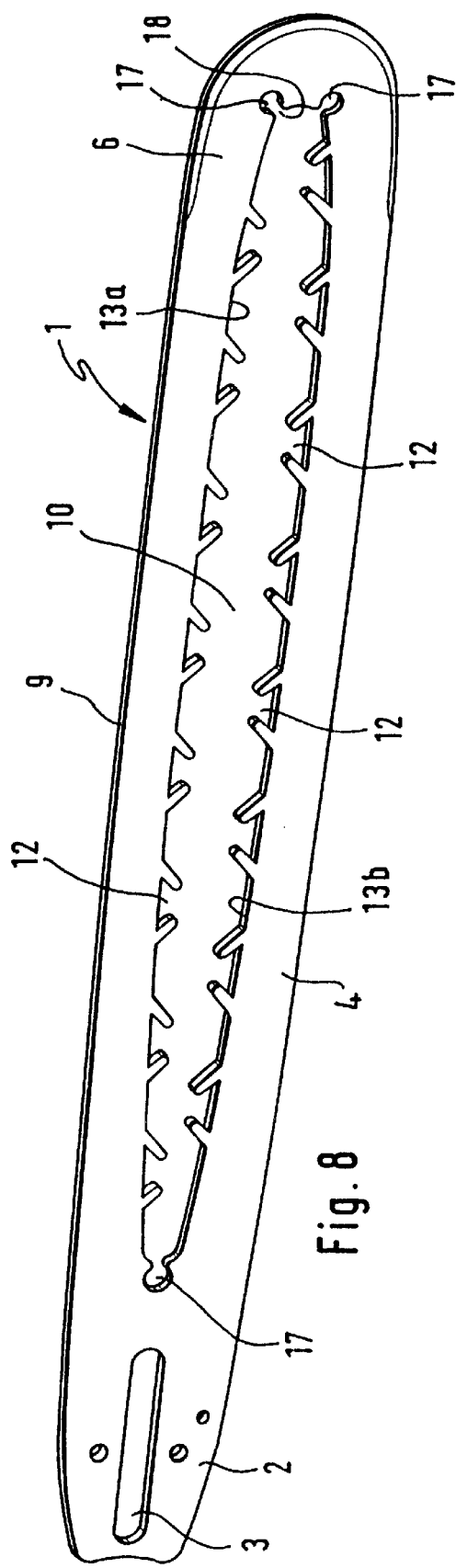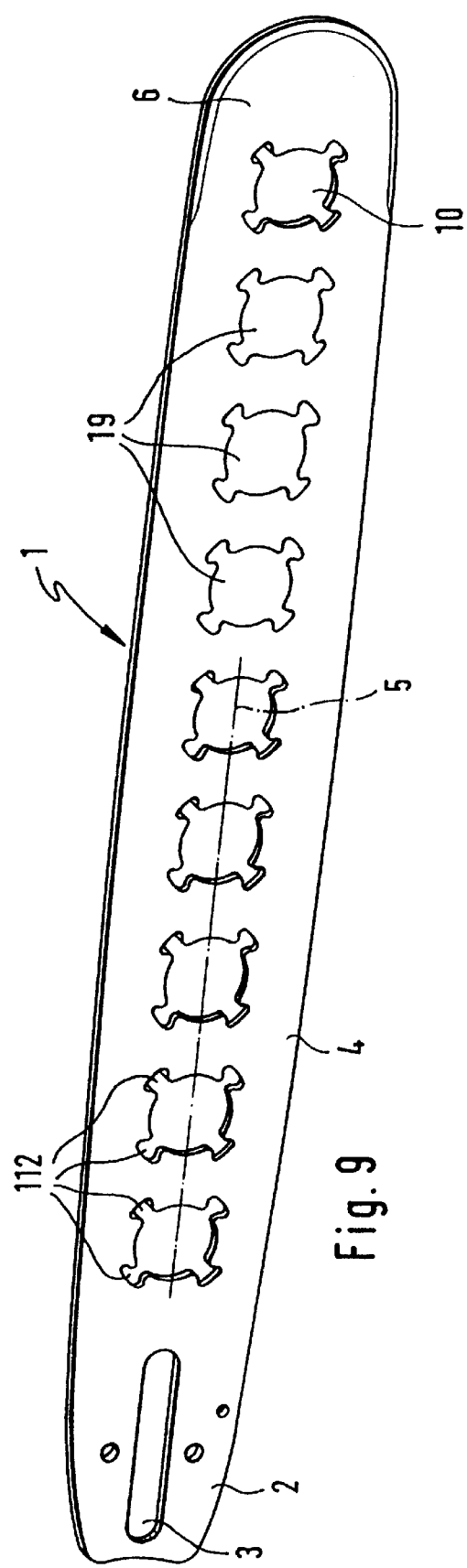

GUIDE BAR FOR A MOTOR CHAIN SAW

BACKGROUND OF THE INVENTION

The present invention relates to a guide bar for a saw chain of a motor chain saw. The guide bar is comprised of a single member steel plate having a circumferential groove extending in the longitudinal direction of the guide bar for guiding a saw chain. The steel plate has a cutout extending over a portion of its length and a portion of its height in which a member of a material of reduced density compared to the steel plate is rececived. The circumferential edge of the cutout facing the member is provided with undercuts in the plane of the steel plate which undercuts provide positive locking connection to the member.

The guide bar is detachabily clamped to the motor chain saw and projects forward with its entire length. Due to the unilateral connection, the guide bar must be able to compensate great forces when loading occurs at its free end. This may result in great bending and/or torsional forces within the guide bar. These lo ads are the stronger the longer the guide bar is. The guide bar must therefore have a great stiffness which must be provided by a correspondingly heavy construction. However, a heavy guide bar is disadvantageous for hand-held portable motor chain saws because handling and manipulation is made more difficult.

From U.S. Pat. No. 4,903,40 a guide bar is known which is comprised of a single member steel plate which is referred to as a solid bar. The steel plate is provided within the center plane with a cutout that extends substantially over the entire length end most of the height of the guide bar. A plastic material is inserted into the cutout which plastic material has a smaller dentsity than the steel plate. For achieving a secure connection of the plastic member in the steel plate, an adhesive, for example, an epoxide resin, is used and applied to the circumferential edge of the cutout. However, such solid guide bars still have problems with regard to the their stiffness, especially when used over extended periods of time and when they have a great length.

It is therefore an object of the present invention to improve a guide bar of the solid guide bar type such that with reduced weight an torsional increased stiffness with respect to bending, pressure, and torsenial loads is achieved.

SUMMARY OF THE INVENTION

The guide bar for a saw chain of a motor chain saw according to the present invention is primarily characterized by:

A single member steel plate having a center plane and circumferential guide groove for guiding a saw chain extending in the center plane;

The steel plate having a longitudinal extension and a height perpendicular to the longitudinal extension:

The steel plate having a cutout extending over a portion of the longitudinal extension and over a portion of the height:

A filing member, consisting of a casting material having a smaller density than the steel plate, cast into the cutout;

The cutout having a circumferential edge facing the filling member;

The circumferential edge having undercuts uniformaly distributed along the circumferential edge:

The filling member having a shrinkage rate of at least 0.5% for engaging positive-lockingly the undercuts upon solidification of the casting material to there by create a uniformly distributed pre-tension within the center plane of the guide bar in the unloaded state of the guide bar.

The undercuts are preferably gaps provided in the circumferential edge.

The gaps, when viewing a lateral surface of the guide bar, have a dovetail shape.

Advantageously, the circumferential edge has uniformaly distributed protrusions projecting into the cutout arranged within the center plane;

The gaps are delimited by two adjacent once of the protrusions;

The two adjacent protrusions are slanted toward one another and have free ends spaced at distance from one another.

Preferably, the steel plate and the protrusions have identical thickness.

The protrusions have are preferably straight.

The protrusions may have a curved transition into the circumferential edge.

The circumferential edge preferably comprises a first and second opposed longitudinal edge portions, and first ones of the undercuts are arranged on the first longitudinal edge portion while second one of the undercuts are arranged on the second longitudinal edge portion. The first undercuts are aligned with the second undercuts or, in the alternative, are staggered relative to the second undercuts.

The undercuts have a part-circular shape.

The circumferential edge has uniformaly distributed protrusions projecting into the cutout, wherein the protrusions have a head, and wherein the undercuts are delimited by a portion of the circumferential edge and the head.

Expediently, the protrusions are positioned directly adjacent to the circumferential edge.

The protrusions may have an axis of symmetry extending perpendicularly to the circumferential edge into the cutout.

Preferably, the circumferential edge has an edge surface and portions of the edge surface are positioned at different angles relative to the center plane.

The transition between the angles is preferably continuous.

The cutout is preferably cut by a laser beam.

The casting material is preferably a plastic material.

The shrinkage of the casting material which has a smaller specific density than the steel plate, causes during solidification the generation of tensioning forces which, due to the positive locking engagement of the lighter material at the circumferential edge of the cutout result in a tensioning of the hardened casting material within the steel plate. In the loaded state of the guide bar, pretensioning forces act in the plane of the steel plate onto the steel plate. The pretensioning forces provide the guide bar with a high bending stiffness and torsional stiffness. The filling member thus already acts in a reinforcing manner onto the guide bar before bending, pressure, or torsional forces are even introduced. The shrinkage of the lighter-weight material that causes the pretension forces also result in a frictional connection of the filling member in a direction perpendicular to the plane of the guide bar.

Preferably, the undercuts are provided in the form of gaps provided at the circumferential edge of the cutout, whereby each gap is defined by two spaced-apart protrusions extending within the plane of the cutout and distributed in the circumferential direction along the circumferential edge. Due to the thus defined cutouts between the protrusions, force introduction into the steel plate of the guide bar is ensured, at each connecting point of a protrusion to the circumferential edge, i.e., the force introduction is provided at many locations distributed along the circumference of the cutout so that a uniform pretension is provided. The gaps are preferably uniformaly distributed along the circumferential edge of the cutout. Preferably, the gaps of opposed parallel longitudinal portions of the circumferential edge are aligned with one another.

BRIEF DESCRIPTION OF THE DRAWINGS

The object and advantages of the present invention will appear more clearly from the following specification in conjunction with the accompanying drawings, in which:

FIG. 6 is a side view of a further embodiment of the guide bar with a cutout that tapers to the end of the guide bar;

FIG. 7 is a side view of a further embodiment of the inventive guide bar;

FIG. 8 shows in a perspective representation an embodiment of the inventive guide bar with undercuts that are staggered relative to one another;

FIG. 9 is a perspective representation of an embodiment of the inventive guide bar with a plurality of openings arranged in the longitudinal direction at a distance to one another;

DESCRIPTION OF PREFERRED EMBODIMENTS

The present invention will not be described in detail with the aid of several specific embodiments utilizing FIGS. 1 through 22.

Figure 1:
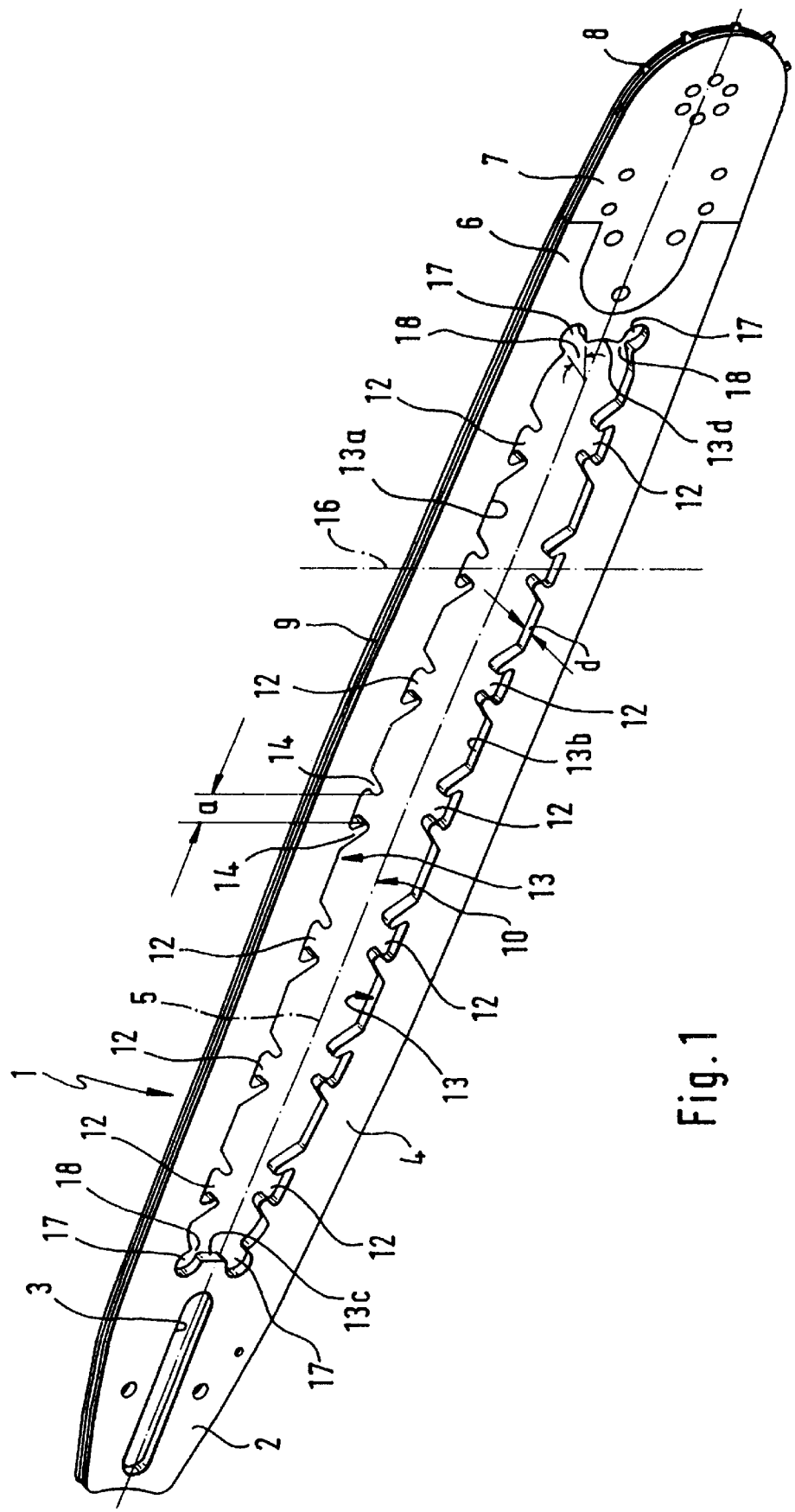
FIG. 1 is a perspective view of a guide bar comprised of a single member steel plate with a filling member of a lighter material, preferably plastic, inserted into the cutout of the steel plate.

The guide bar 1 represented in FIG. 1 serves for guiding a saw chain of a motor chain saw as, for example, disclosed in German patent application DE 37 30 171 A1. The guide bar 1 which is also referred to as a solid bar is comprised substantially of a single member steel plate for having a rear clamping end 2 and a slotted hole 3 positioned along the longitudinal center axis 5 of the guide bar 1 for receiving clamping bolts with which the guide bar 1 is connected in a manner known per se to the motor chain saw. The leading end 6 of the steel plate 4 opposite the clamping end 2 supports a head 7 for deflecting the saw chain. In the shown embodiment, the head 7 is a deflecting star 8 positioned in a rotatable manner within the guide groove. The head 7 can be a unitary part of the steel plate 4.

For circulating the saw chain about the guide bar 1, the circumference of the guide bar is provided with a circumferential groove 9. The single member steel plate 4 has at least one cutout for reducing its weight which cutout 10 extends over a portion of the longitudinal extension of the guide bar 1 and over part of its height. In some of the shown embodiments the cutout is a single opening and substantially rectangular and extends in the direction of the longitudinal center axis of the guide bar 1. With the exception of the embodiment according to FIG. 9, the cutout 10 extends from the rear ward clamping end to the leading end 6 of the steel plate 4 where the head 7 is secured and has approximately half the height of the steel plate. In the shown embodiment according to FIG. 1, 6, 7, and 9, the cutout 10 is exactly symmetrically positioned relative to the longitudinal center axis 5 when viewing the guide bar in a side view.

In order to provide the steel plate 4, and thus the guide bar 1, with a high torsional stiffness, the cutout 10 is filled with a filling member comprised of a casting material, preferably a plastic material that has smaller density than the steel plate and, in the plane E of the guide bar 1, positive-lockingly engages the undercuts 12 of the cutout. The material of reduced density relative to the steel plate has a shrinkage rate of approximately 0.5 to 1% or more and is cast into the cutout 10 or injected into cutout 10 until the entire volume of the cutout is filled. Due to the shrinkage resulting during solidification of the casting material in the center plane E (FIG. 3 through 5) of steel plate 4, respectively, the guide bar 1, a tensioning force is generated and its force components are directed into the cutout 10. The tensioning forces provided within the center plane E thus result in a considerable increase of the torsional stiffness of the guide bar 1 so that a lightweight, but torsionally stiff guide bar for working even under difficult conditions is provided. Especially when the guide bar has a great length, a considerable weight reduction and thus and improved handling with still sufficient torsional stiffness of the guide bar is provided.

In the following, reference is made to a plastic material as a material of smaller specific density. Plastic materials have the advantage that they can be easily processed, can be modified according to specific requirements, and have advantageously only a minimal density. Also, other materials of reduced density such as aluminum and aluminum alloys can also be advantageously used.

The plastic material 11, after solidifying within the cutout 10 of the guide bar 1, forms a filling member 19 (FIG. 2) that in the center plane E of the steel plate 4 is positive-lockingly connected with undercuts 12 to the circumferential edge 13 of the cutout 10 so that upon solidification (harden or curing) of the plastic material tensioning forces, resulting from the shrinkage of the plastic material, will be securely introduced into the steel plate 4. The hardened plastic member 19 is reliably secured by positive-locking meshing engagement within the plane of the steel plate 4 at the circumferential edge 13 of the cutout 10. Due to the generation of a frictional connection with the circumferential edge 13, the plastic member 19 is secured force-lockingly in a direction perpendicular to the plane of the guide bar 1.

The undercuts provided at the circumferential edge 13 of the cutout 10 are in the form of gaps 12 which, in a side view, are substantially of a dovetail shape. In the shown embodiment, each gap 12 is delimited literally by two protrusions that in the circumferential direction of the circumferential edge have a spacing a relative to one another. The protrusions 14 project into the cutout 10 and are bent toward one another for forming the undercuts. The angle of slant 15 of the protrusions 14 are preferably identical. In the shown embodiment, the angles are approximately 30° to 60°, preferably 45°. The protrusions 14 have expediently the same thickness d as the steel plate 4.

The plurality of gaps 12, respectively, protrusions 14 is arranged along the circumference of the edge 13 of the cutout 10 in a uniform manner so that a substantially uniform distribution of the tension forces is provided. In the embodiments according to FIG. 1, 6, and 7, the gaps 12 of one longitudinal edge portion 13a are aligned with the gaps 12 of the opposite arranged longitudinal edge portion 13B. The center normal 16 (FIG. 2) of gaps 12 of the oppositely arranged, substantially parallel longitudinal edge portions 13a and 13b are coaxially positioned relatively to one another and intercept the longitudinal center axis 5 of the guide bar 1 at a right angle.

It may be expedient to stagger the gaps 12 of one longitudinal edge portion 13a relative to the gaps 12 of the opposite longitudinal edge portion 13b, as shown in FIG. 8.

As shown in FIG. 1, the longitudinal edges portions 13A and 13B and in gaps 17 which have a part-circular shape with an opening angle 18 of less than 180°, preferably less than 90°. The gaps 17 connect the longitudinal edge portions 13a and 13b of the circumferential edge 13 with the narrow sides 13c and 13d off the cutout 10.

Figure 2:
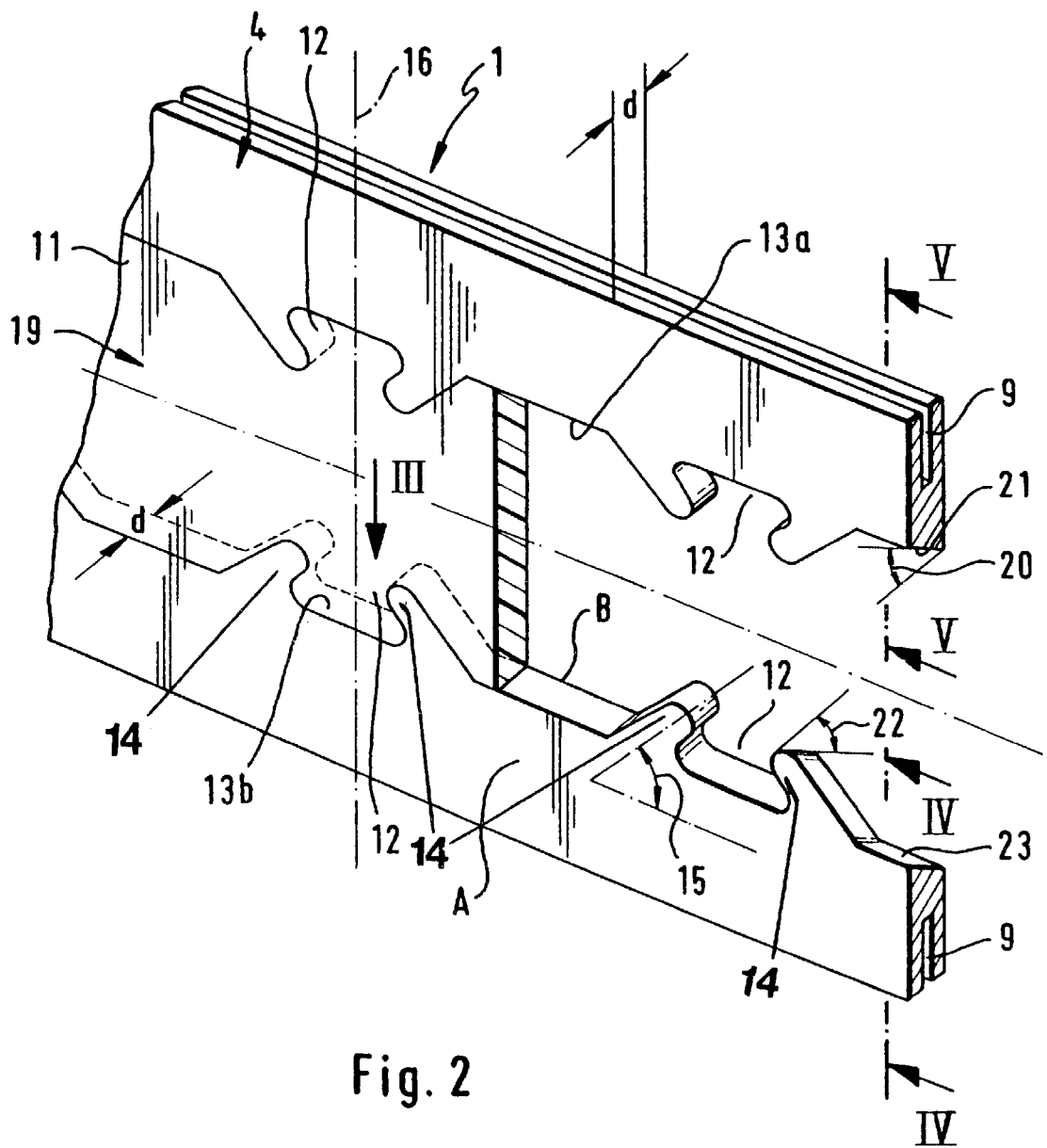
FIG. 2 is an enlarged representation of a detail of the guide bar of FIG. 1 with the cutout filled by the filling member.
Figure 5:
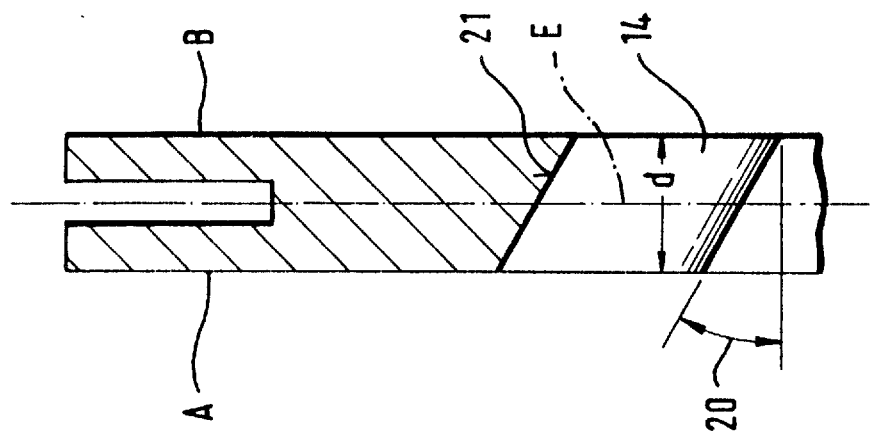
FIG. 5 is a sectional view through the circumferential edge of the cutout according to arrow V of FIG. 2.
Figure 4:
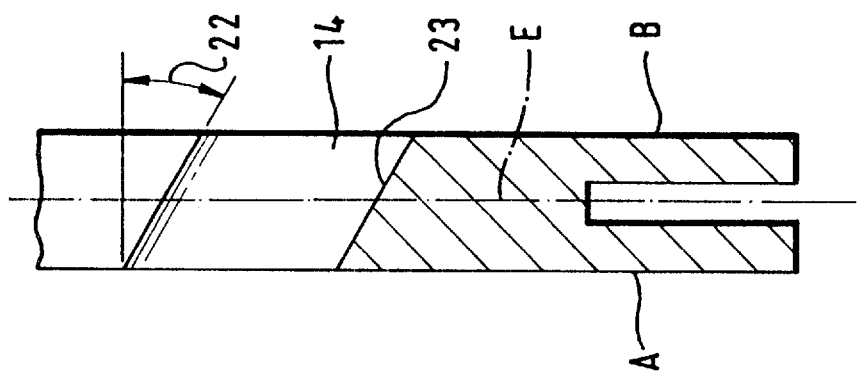
FIG. 4 is a sectional view through the circumferential edge of the cutout according to arrow IV of FIG. 2.

As indicated in FIG. 2, it may be expedient to embody the edge surface of the circumferential edge 13 in portions to 21, 23 with different angles 20, 22 in the circumferential direction of the cutout 10. As shown FIG. 2, at one longitudinal edge portion 13a of the edge surface a portion 21 of the edge surface is slanted relative to center plane E of the guide bar one such that the edge surface of the portion 21 faces in the same direction as the lateral side A of the steel plate 4. At the opposite by arranged longitudinal edge portion 13b a portion 23 having an angle 22 to the plane E is provided so that the edge surface in this area is facing in the same direction as the lateral side B of the steel plate 4. The angles 20 and 22 can be of identical size. The angle 20 opens, however, in the direction toward the lateral side A of the steel plate 4 while the other angle 22 opens toward the lateral side B of the steel plate 4. This can also be seen in FIGS. 4 and 5. It may be expedient to embody the angles 20 of the portions 21 of one lateral edge differently so that the protrusion 14 is designed as shown in FIGS. 4 or 5 and a neighboring protrusion 14 of the same edge portion is designed as shown FIG. 3.

Figure 3:
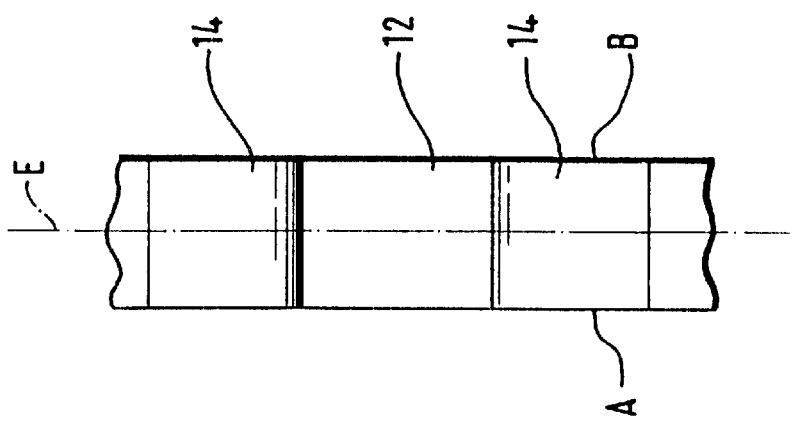
FIG. 3 shows a plan view of a gap at the circumferential edge of the cutout according to arrow III of FIG. 2.

Preferably, a portion of the edge surface of the circumferential edge 13 is positioned exactly perpendicularly to the center plane E of the guide bar 1, as shown in FIG. 3. Another portion 23 of the edge surface is positioned so as to be slanted downwardly from the lateral surface A toward the lateral surface B so that an opening angle 22 is formed that opens toward the lateral side B. Another portion 21 the edge surface of the circumferential edge 13 is positioned at an angle 20 slanted relative to the center plane E whereby the angle 20 opens toward the lateral side A. Due to the portions 21, 23 of the edge surface of the circumferential edge 13 being positioned at different angles 20 and 22, a form-locking anchoring of the hardened plastic filling member 19 perpendicular to the plane E of the guide bar 1 results. Accordingly, the filling member 19 is not only secured by frictional connection at the protrusions 14 perpendicularly to the center plane E of the guide bar 1, but also by the aforedescribed constructive measure perpendicularly to the center plane E in a positive-locking manner.

The cutout 10 is preferably produced by laser beam cutting from one of the lateral sides A, B. This machining step allows in a simple manner producing the circumferential edge of the cut out with different angles relative to the center plane E of the steel plate 4 by changing the angle of the laser beam. The transitions from the angle 20 to the angle 22 of neighboring portions 21, 23, respectively, can be continuously. The edge surface of the portions 21, 23 is slanted over the entire thickness d of the steel plate 4 whereby such a slanted portion may also extend in the circumferential direction along a protrusion 14 and through the adjacently positioned gap 12.

The cutout 10 can also be produced by stamping instead of by laser beam cutting. When removing the stamped center portion, the edge surface of the circumferential edge 13 can be easily deformed and can become slanted. When the cutout 10 is produced in two stamping steps, whereby one stamping step is performed on either side of the steel plate and the material is respectively removed to either side, an under cut is formed at the edge.

In connection with laser beam cutting undercuts can also be easily produced because the laser beam, in front of and behind the focal point, may widen slightly.

In the embodiment according to FIGS. 6 through 8, an embodiment is shown which provides an increased stiffness of the guide bar in the direction of the clamping end.

In contrast to the embodiment according to FIG. 1, the cutout 10 narrows in the direction toward the clamping end 2, i.e., the end section 10a facing the clamping end 2 has a smaller height than the remaining cutout 10. In the embodiment according to FIG. 6, the longitudinal edge 13a and 13b of the cutout 10 converge toward one another in the end section 10a and have a transition into a part-circular gap 17. The connecting portion 27 positioned between the part-circular gap 17, the end section 10a and the neighboring straight protrusions 14 of the gap 12, when viewed in a side view, is similar to a quarter circle which is positioned symmetrically relative to the longitudinal center axis 5 of the guide bar 1. The part-circular gap 17 within the end portion 10A that connects the longitudinal edge portion 13a and 13b opens in the direction toward the connecting portion 27 and is also symmetrically arranged relative to the longitudinal center axis 5 of the guide bar 1.

The end 10b of the cutout 10 facing the head 7 is also shaped as a quarter circle which is symmetrically positioned relative to the longitudinal center axis 5. On either side of the longitudinal center axis 5, part-circular gaps 17 are positioned which, as disclosed in connection with the embodiment according to FIGS. 1 and 2, provide the connection between the narrow side 13d off the cutout and the longitudinal edges 13a and 13b.

A casting material, preferably a plastic material, having a reduced density relative to the steel plate, is cast into the cutout 10 and shrinks upon harden or solidification. The undercuts 12 cause the tensioning of the guide bar 1 in the longitudinal direction so that a great stiffness results.

The guide bar according to FIG. 7 corresponds substantially to the guide bar of FIG. 6. The difference is the connecting section 27 of the end portion 10a of the cutout 10 which is, in this embodiment, of a trapezoidal shape whereby the longer base faces the cutout 10. The smaller base is adjacent to the clamping end 2. Adjacent to the smaller base, a part-circular gap 17 is arranged whereby the gap 17 as well as the connecting section 27 are symmetrically positioned relative to the longitudinal center axis 5 of the guide bar 1. The end 10b of the cutout 10 facing the head 7, in deviation from the embodiment according to FIG. 6, also has a trapezoidal shape whereby the longer base of the trapeze faces the cutout 10 end and the smaller base of the trapeze faces the head 7. This trapezoidal end 10b also is symmetric to the longitudinal center axis 5.

The embodiment according to FIG. 8 corresponds substantially to that of FIG. 7 whereby, however, the gaps 12 of the oppositely arranged longitudinal edge portion 13a and 13b are staggered to one another. The displacement can be symmetrical to the spacing of the gaps. However, an asymmetric arrangement can also be beneficial for producing increased stiffness.

The guide bar according to FIG. 9, in contrast to the other embodiments has a plurality of cutouts 10. In the shown embodiment nine cutouts are positioned along the longitudinal center axis 5 and are spaced with identical spacing to one another. Each cutout, which is of a circular shape, has at its circumference uniformly distributed undercuts 112 so that, respectively, two undercuts 112 are positioned diametrically opposite one another with respect to the center of the circle. The position of the undercuts 112 is such that, relative to the longitudinal center axis 5, two undercuts of one cutout 10 are positioned on the same side of the longitudinal center axis 5. The longitudinal center axis 5 thus is a symmetry axis.

FIGS. 1 and 6 show solid guide bars with attached head 7, while FIGS. 7, 8, and 9 show solid guide bars in which the head is a unitary part of the guide bar.

FIG. 10 through 22 show possible embodiments of the undercuts provided at the cutout.

Figure 10:
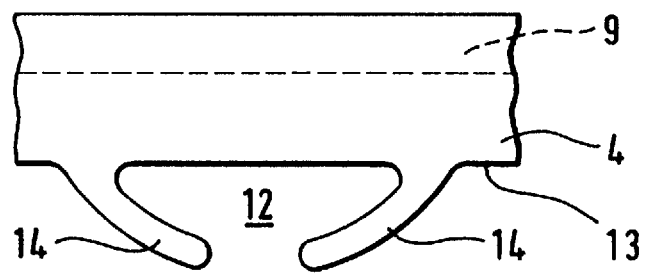
FIG. 10 shows in an enlarged representation a dovetail-shaped undercut defined by protrusion.

FIG. 10 shows a gap 12 as an undercut which is delimited by two protrusions 14 at the circumferential edge 13. This gap 12 is identical to the gap 12 shown in FIGS. 1 and 2. However, the protrusions 14 represented in FIG. 10 are slightly bent toward the circumferential edge 13 from which they project.

Figure 11:
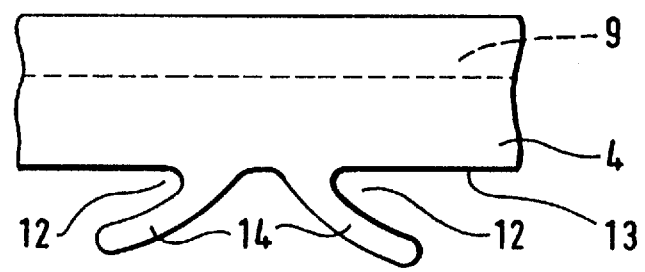
FIGS. 11 to 13 show enlarged representations of bent protrusions for forming undercuts.

In the embodiment according to FIG. 11, the protrusions 14 are also of a curved arrangement as shown in FIG. 10, however, the undercuts 12 in this embodiment are defined by the edge 13 and one protrusion 14 and are open in the circumferential direction of the circumferential edge 13. Thus, in the embodiment according to FIG. 10, the gap 12 is delimited by two protrusions 14 pointing toward one another, while in FIG. 11 the gap is defined only by one protrusion 14, and the adjacent protrusions point away from one another. In the embodiment according to FIG. 11, the filling member thus engages behind the protrusion 14 perpendicular to the circumferential edge 13 so that forces are introduced into the steel plate 4 transverse to the longitudinal center axis of the guide bar.

Figure 12:
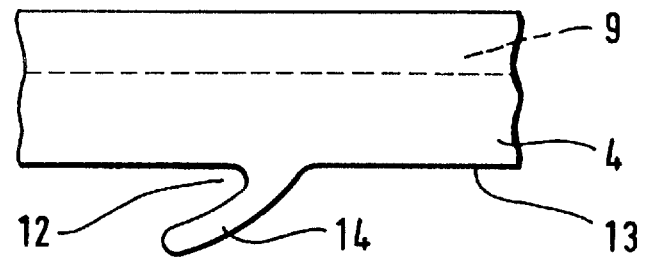

In the embodiment according to FIG. 12, only one protrusion 14 is provided which, together with the circumferential edge 13, delimits the undercut 12. In the embodiment according to FIG. 12, all undercuts 12 open in the same direction, while in the embodiment according to FIG. 11 the undercuts 12 open alternatingly in opposite directions.

Figure 13:
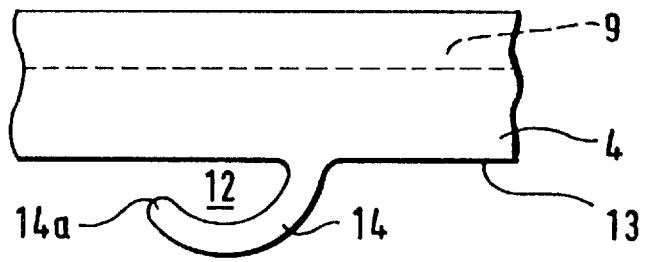
Figure 14:
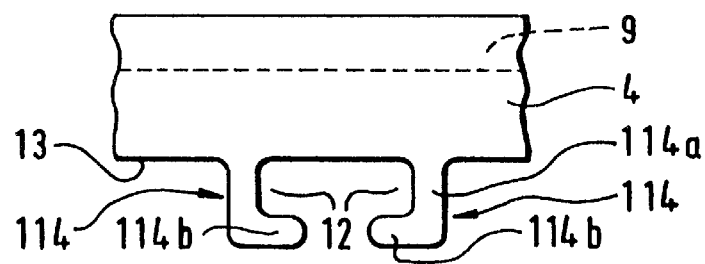
FIGS. 14 to 17 show enlarged representation of L-shaped protrusions for forming undercuts.

In the embodiment according to FIG. 13, the undercut 12 is delimited by a protrusion 14 that is bent toward the circumferential edge 13 to such an extent that its free end 14a is positioned closely to the circumferential edge 13. In this embodiment the undercuts 12 also open in the circumferential direction of the edge 13 in the same direction. An arrangement of the greatly bent protrusion 14 with alternating opening directions of the undercuts 12 may also be expedient.

In the embodiments according to FIG. 14 through 17, L-shaped protrusions 114 (in side view) are positioned in an alternating arrangement. In all embodiments the L-shaped protrusion 14 is connected with one end of the longer leg 114a to the circumferential edge 13 of the cutout 10. The longer leg 114a, which is a unitary part of the steel plate 4, is positioned substantially at a right angle to the longitudinal center axis 5 of the guide bar. The shorter leg 114b is positioned substantially parallel to the neighboring circumferential edge 13 and defines together with it the undercut 12. In the embodiment according to FIG. 14, the shorter legs 114b of neighboring protrusions 114 face one another so that pairs of protrusions 114 delimit a gap 12 which is constricted in the direction toward the cutout 10 by the shorter legs 114b.

Figure 15:
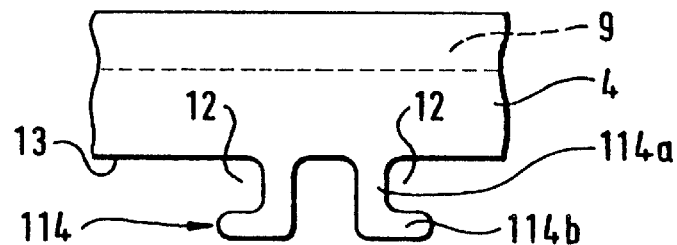

In the embodiment according to FIG. 15, the shorter legs 114b face away from one another so that, similar to the embodiment according to FIG. 11, undercuts 12 result which in the circumferential direction of the edge 13 open alternatingly in opposite directions.

Figure 16:
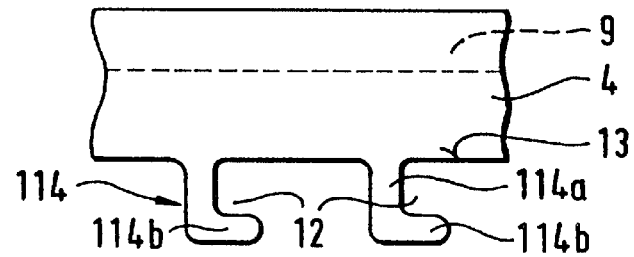

In the embodiment according to FIG. 16 the shorter legs 114 face in the same circumferential direction of the circumferential edge 13 so that the undercuts delimited thereby open in the same circumferential direction.

Figure 17:
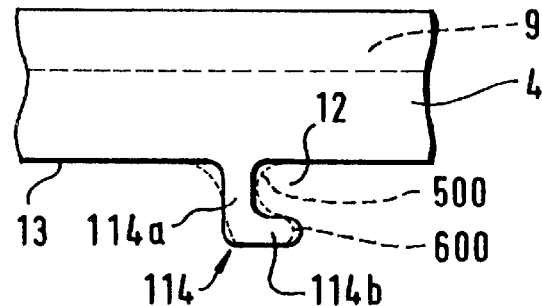

In the embodiment according to FIG. 17, a single protrusion 114 is shown which is already sufficient to provide an undercut 12 between the shorter leg 114B end and the circumferential edge 13. Thus undercut extends transverse to the longitudinal center axis 5.

Figure 18:
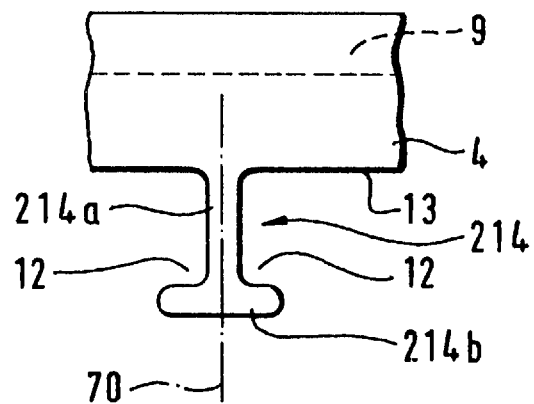
FIGS. 18 and 19 show enlarged representations of T-shaped protrusions for generating undercuts.
Figure 19:
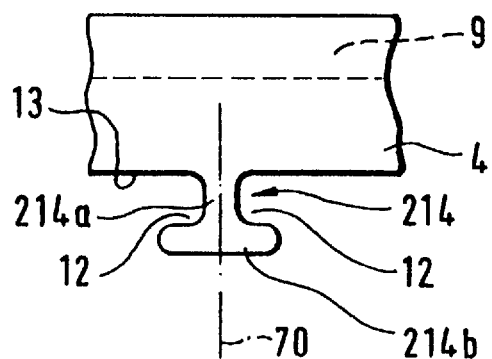

In the embodiment according to FIG. 18 and 19, a T-shaped protrusion 214 is provided. The protrusion is a unitary part of the steel plate 4 and is connected with the vertical bar of the T to the circumferential edge 13 of the steel plate 4. The vertical bar 214a of the T is positioned at a right angle to the longitudinal center axis 5 of the guide bar while the head portion 214b extends parallel to the longitudinal center axis 5, respectively, substantially parallel to the neighboring circumferential edge 13. The lateral portions of the head portion 214b to the right and to the left of the vertical bar 214a delimit together with the circumferential edge 13 an undercut 12 which extends transverse to the longitudinal center axis of the guide bar. According to FIG. 18, the bar 214a may be longer than the head portion 214b. In the embodiment according to FIG. 19, the bar 214a is shorter than the head portion 214b so that the head portion 214b is positioned closely adjacent to the longitudinal edge 13.

Figure 20:
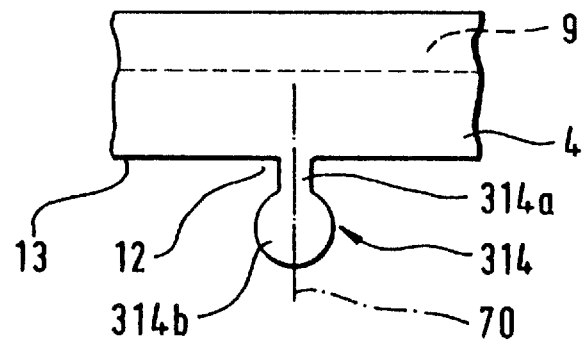
FIGS. 20 and 21 show enlarged representations of part-circular protrusions for generating undercuts.

In the embodiment according to FIG. 20 a protrusion 314 is shown which, in a side view, is comprised of a substantially circular head 314b which is connected by a stay 314a to the circumferential edge 13 of the cutout 10 of the steel plate 4. The stay 314a is positioned at a right angle to the longitudinal center axis 5 of the guide bar, respectively, to the neighboring portion of the circumferential edge 13. The stay 314a is smaller than the diameter of the circular head 314B so that the projecting portions of the head 314b on either side of the stay 314a provide undercuts 12 acting transverse to the longitudinal center axis 5 of the guide bar 1.

Figure 21:
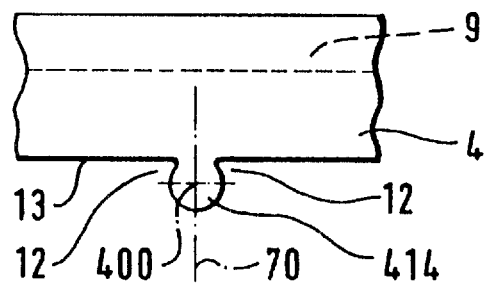
Figure 22:
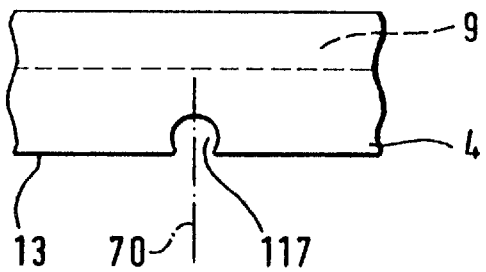
FIG. 22 is an enlarged representation of a part-circular recess at the circumferential edge for forming an undercut.

In the embodiment according to FIG. 21, a circular protrusion 414 is provided which is directly positioned adjacent to the circumferential edge 13 of the cutout 10 in the steel plate 4. The center point 400 of the circular protrusion 414 is positioned at a spacing to the circumferential edge 13 so that an undercut 12 is provided that extends transverse to the longitudinal axis 5 of the guide bar 1.

It may be expedient to provide a recess 117 as an undercut within the circumferential edge 13 of the cutout of the steel plate 4. According the shown embodiment of FIG. 22, the undercut has a circular shape with a circumferential angle of more than 180° but less than 360°. Such a recess 117 will be engaged by the filling member so that the meshed interaction of the steel plate and the filling member results in tensioning forces upon shrinkage of the filling member during harden or solidification.

The protrusions 214, 314, and 414 is well as the recess 117 have an axis of symmetry 70 which is positioned at a right angle to the longitudinal center axis of the guide bar 1.

When the cutout 10 in the steel plate 4 is produced by laser beam cutting, it may be expedient to vary the cutting angle of the laser beam, i.e., the laser beam cuts the material not at a right angle to the steel plate 4 but at an angle deviating from such perpendicular arrangement. A changing or varying cutting angle can also be produced by providing the laser beam with a curvature. This is especially advantageous when cutting the protrusions 114 (FIG. 17) because by doing so the desired displacement between the edge 500 on one side of the steel plate 4 and the edge 600 on the other side of the steel plate 4 is produced. This displacement generates an additional fixation of the filling member made of a light-weight material (plastic material).

The present invention is, of course, in no way restricted to the specific disclosure of the specification and drawings, but also encompasses any modifications within the scope of the appended claims.

What is claimed is:

1. A guide bar for a saw chain of a motor chain saw, said guide bar comprised of:

a single member steel plate having a center plane and a circumferential guide groove for guiding a saw chain extending in said center plane;

said steel plate having a longitudinal extension and a height perpendicular to said longitudinal extension;

said steel plate having a cutout extending over a portion of said longitudinal extension and over a portion of said height;

a filling member, consisting of a casting material having a smaller specific density than said steel plate, cast into said cutout;

said cutout having a circumferential edge facing said filling member;

said circumferential edge having undercuts uniformly distributed along said circumferential edge;

said filling member having a shrinkage rate of at least 0.5% for engaging positive-lockingly said undercuts upon solidification of said casting material to thereby create a uniformly distributed pretension within said center plane of said guide bar in an unloaded state of said guide bar.

2. A guide bar according to claim 1, wherein said undercuts are gaps provided in said circumferential edge.

3. A guide bar according to claim 2, wherein said gaps, when viewing a lateral surface of said guide bar, have a dovetail shape.

4. A guide bar according to claim 2, wherein:

said circumferential edge has uniformly distributed protrusions projecting into said cutout and arranged within said center plane;

said gaps are delimited by two adjacent ones of said protrusions;

said two adjacent protrusions are slanted toward one another and have free ends spaced at a distance from one another.

5. A guide bar according to claim 4, wherein said steel plate and said protrusions have identical thickness.

6. A guide bar according to claim 4, wherein said protrusions are straight.

7. A guide bar according to claim 4, wherein said protrusions have a curved transition into said circumferential edge.

8. A guide bar according to claim 1, wherein:

said circumferential edge comprises a first and a second opposed longitudinal edge portions;

first ones of said undercuts are arranged on said first longitudinal edge portion and second ones of said undercuts are arranged on said second longitudinal edge portion; and said first undercuts are aligned with said second undercuts.

9. A guide bar according to claim 1, wherein:

said circumferential edge comprises a first and a second opposed longitudinal edge portions;

first ones of said undercuts are arranged on said first longitudinal edge portion and second ones of said undercuts are arranged on said second longitudinal edge portion; and said first undercuts are staggered relative to said second undercuts.

10. A guide bar according to claim 1, wherein said undercuts have a part-circular shape.

11. A guide bar according to claim 1, wherein said circumferential edge has uniformly distributed protrusions projecting into said cutout, wherein said protrusions have a head and wherein said undercuts are delimited by a portion of said circumferential edge and said head.

12. A guide bar according to claim 11, wherein said protrusions are positioned directly adjacent to said circumferential edge.

13. A guide bar according to claim 11, wherein said protrusions have an axis of symmetry extending perpendicularly to said circumferential edge into said cutout.

14. A guide bar according to claim 1, wherein said circumferential edge has an edge surface and wherein portions of said edge surface are positioned at different angles relative to said center plane.

15. A guide bar according to claim 14, wherein a transition between said angles is continuous.

16. A guide bar according to claim 1, wherein said cutout is cut by a laser beam.

17. A guide bar according to claim 1, wherein said casting material is a plastic material.

* * * * *